(12) United States Patent
Khare

(10) Patent No.: US 10,183,284 B2
(45) Date of Patent: Jan. 22, 2019

(54) AROMATIZATION CATALYSTS WITH HIGH SURFACE AREA AND PORE VOLUME

(71) Applicant: Chevron Phillips Chemical Company LP, The Woodlands, TX (US)

(72) Inventor: Gyanesh P. Khare, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 232 days.

(21) Appl. No.: 15/175,214

(22) Filed: Jun. 7, 2016

(65) Prior Publication Data
US 2016/0318008 A1 Nov. 3, 2016

Related U.S. Application Data

(62) Division of application No. 13/626,904, filed on Sep. 26, 2012, now Pat. No. 9,387,467.

(51) Int. Cl.
| | | |
|---|---|---|
| *C10G 35/085* | (2006.01) | |
| *B01J 29/62* | (2006.01) | |
| *B01J 29/06* | (2006.01) | |
| *B01J 29/068* | (2006.01) | |
| *B01J 35/10* | (2006.01) | |
| *C10G 35/095* | (2006.01) | |
| *B01J 38/12* | (2006.01) | |
| *B01J 29/072* | (2006.01) | |
| *B01J 29/63* | (2006.01) | |
| *B01J 29/90* | (2006.01) | |
| *B01J 37/02* | (2006.01) | |
| *B01J 37/08* | (2006.01) | |
| *B01J 38/10* | (2006.01) | |
| *B01J 37/24* | (2006.01) | |
| *B01J 37/30* | (2006.01) | |
| *B01J 37/00* | (2006.01) | |

(52) U.S. Cl.
CPC ............. *B01J 29/62* (2013.01); *B01J 29/061* (2013.01); *B01J 29/068* (2013.01); *B01J 29/072* (2013.01); *B01J 29/63* (2013.01); *B01J 29/90* (2013.01); *B01J 35/1019* (2013.01); *B01J 35/1038* (2013.01); *B01J 37/0207* (2013.01); *B01J 37/08* (2013.01); *B01J 38/10* (2013.01); *B01J 38/12* (2013.01); *C10G 35/095* (2013.01); *B01J 35/108* (2013.01); *B01J 35/1042* (2013.01); *B01J 35/1047* (2013.01); *B01J 37/0018* (2013.01); *B01J 37/24* (2013.01); *B01J 37/30* (2013.01); *B01J 2229/186* (2013.01); *B01J 2229/20* (2013.01); *B01J 2229/42* (2013.01)

(58) Field of Classification Search
CPC ...... C10G 35/09; C10G 35/095; C10G 35/08; C10G 35/085

USPC ........ 585/430, 419, 421; 208/135, 137, 138, 208/140, 141
See application file for complete search history.

(56) References Cited

U.S. PATENT DOCUMENTS

| | | | |
|---|---|---|---|
| 2,906,702 | A | 9/1959 | Brennan et al. |
| 3,898,173 | A | 8/1975 | Hayes |
| 3,941,716 | A | 3/1976 | Paynter |
| 3,969,267 | A | 7/1976 | McVicker |
| 4,094,814 | A | 6/1978 | Lemberger et al. |
| 4,104,320 | A | 8/1978 | Bernard et al. |
| 4,435,283 | A | 3/1984 | Buss et al. |
| 4,444,895 | A | 4/1984 | Fung et al. |
| 4,444,896 | A | 4/1984 | Fung et al. |
| 4,444,897 | A | 4/1984 | Fung et al. |
| 4,447,551 | A | 5/1984 | Fung et al. |
| 4,456,527 | A | 6/1984 | Buss et al. |
| 4,467,045 | A | 8/1984 | Fung |
| 4,472,514 | A | 9/1984 | Fung |
| 4,472,515 | A | 9/1984 | Fung |
| 4,473,656 | A | 9/1984 | Fung et al. |
| 4,480,046 | A | 10/1984 | Fung et al. |
| 4,491,635 | A | 1/1985 | Fung et al. |
| 4,491,636 | A | 1/1985 | Fung et al. |
| 4,492,767 | A | 1/1985 | Fung |
| 4,493,901 | A | 1/1985 | Bernard et al. |
| 4,539,304 | A | 9/1985 | Field |
| 4,547,472 | A | 10/1985 | Van Norstrand |
| 4,552,856 | A | 11/1985 | Tauster et al. |
| 4,595,668 | A | 6/1986 | Poeppelmeier et al. |
| 4,595,669 | A | 6/1986 | Fung et al. |
| 4,595,670 | A | 6/1986 | Tauster et al. |
| 4,634,517 | A | 1/1987 | Tauster et al. |
| 4,634,518 | A | 1/1987 | Buss et al. |
| 4,645,751 | A | 2/1987 | McCullen et al. |
| 4,648,960 | A | 3/1987 | Poeppelmeier et al. |
| 4,657,874 | A | 4/1987 | Borghard et al. |
| 4,678,764 | A | 7/1987 | Le et al. |

(Continued)

FOREIGN PATENT DOCUMENTS

| | | |
|---|---|---|
| EP | 0 145 289 | 6/1985 |
| EP | 0 278 851 | 8/1988 |

(Continued)

OTHER PUBLICATIONS

Fukunaga, et al., "Halogen-promoted Pt/KL Zeolite Catalyst for the Production of Aromatic Hydrocarbons from Light Naphtha," published in Catal. Surv. Asia, (2010), vol. 14, pp. 96-102, Springer Science+Business Media, LLC.

(Continued)

*Primary Examiner* — Elizabeth D Wood

(74) *Attorney, Agent, or Firm* — Merchant & Gould, P.C.

(57) ABSTRACT

Regenerable aromatization catalysts having high surface area and pore volume, as well as methods for producing these catalysts, are disclosed.

22 Claims, 1 Drawing Sheet

(56) References Cited

U.S. PATENT DOCUMENTS

| | | |
|---|---|---|
| 4,681,865 A | 7/1987 | Katsuno et al. |
| 4,721,607 A | 1/1988 | Haddad et al. |
| 4,721,694 A | 1/1988 | Buss et al. |
| 4,789,655 A | 12/1988 | Travers et al. |
| 4,810,683 A | 3/1989 | Cohn et al. |
| 4,822,762 A | 4/1989 | Ellig et al. |
| 4,824,816 A | 4/1989 | Trowbridge et al. |
| 4,835,129 A | 5/1989 | Travers et al. |
| 4,839,320 A | 6/1989 | Trowbridge et al. |
| 4,851,380 A | 7/1989 | Van Leirsburg et al. |
| 4,855,269 A | 8/1989 | Mohr |
| 4,872,970 A | 10/1989 | Boyle |
| 4,914,068 A | 4/1990 | Cross et al. |
| 4,925,819 A | 5/1990 | Fung et al. |
| 4,937,215 A | 6/1990 | Murakawa et al. |
| 5,028,312 A | 7/1991 | Miller et al. |
| 5,034,117 A | 7/1991 | De Bonneville et al. |
| 5,106,798 A | 4/1992 | Fung |
| 5,106,803 A | 4/1992 | Mohr et al. |
| 5,155,074 A | 10/1992 | Mohr |
| 5,185,306 A | 2/1993 | Cohn et al. |
| 5,196,631 A | 3/1993 | Murakawa et al. |
| RE34,250 E | 5/1993 | Van Leirsburg et al. |
| 5,220,108 A | 6/1993 | Hashimoto et al. |
| 5,256,612 A | 10/1993 | Fung |
| 5,260,238 A | 11/1993 | Murakawa et al. |
| 5,270,272 A | 12/1993 | Galperin et al. |
| 5,348,924 A | 9/1994 | Potter et al. |
| 5,378,669 A | 1/1995 | Fung |
| 5,389,235 A | 2/1995 | Russ et al. |
| 5,401,365 A | 3/1995 | Chen et al. |
| 5,401,386 A | 3/1995 | Morrison et al. |
| 5,491,119 A | 2/1996 | Verduijn |
| 5,552,035 A | 9/1996 | Potter et al. |
| 5,557,029 A | 9/1996 | Lin et al. |
| 5,573,988 A | 11/1996 | Didillon |
| 5,672,801 A | 9/1997 | Didillon |
| 5,683,573 A | 11/1997 | Haizmann et al. |
| 5,698,486 A | 12/1997 | Fung et al. |
| 5,712,214 A | 1/1998 | Huang et al. |
| 5,726,112 A | 3/1998 | Fung et al. |
| 5,755,956 A | 5/1998 | Galperin et al. |
| 5,756,414 A | 5/1998 | Huang et al. |
| 5,763,348 A | 6/1998 | Fung et al. |
| 5,776,849 A | 7/1998 | Fung et al. |
| 5,792,338 A | 8/1998 | Gosling et al. |
| 5,854,162 A | 12/1998 | Dufresne et al. |
| 5,866,495 A | 2/1999 | Fung et al. |
| 5,880,049 A | 3/1999 | Lacroix et al. |
| 5,880,050 A | 3/1999 | Boitiaux et al. |
| 5,883,031 A | 3/1999 | Innes et al. |
| 5,898,011 A | 4/1999 | Wu et al. |
| 5,935,415 A | 8/1999 | Haizmann et al. |
| 5,980,731 A | 11/1999 | Kao et al. |
| 6,034,019 A | 3/2000 | Fung et al. |
| 6,048,814 A | 4/2000 | Capelle et al. |
| 6,103,652 A | 8/2000 | Brunet et al. |
| 6,110,857 A | 8/2000 | Fung et al. |
| 6,133,183 A | 10/2000 | Capelle et al. |
| 6,143,166 A | 11/2000 | Nacamuli |
| 6,147,022 A | 11/2000 | Brunet et al. |
| 6,190,539 B1 | 2/2001 | Holtermann et al. |
| 6,191,332 B1 | 2/2001 | Duee et al. |
| 6,207,042 B1 | 3/2001 | Holtermann et al. |
| 6,277,335 B1 | 8/2001 | Capelle et al. |
| 6,291,381 B1 | 9/2001 | Lin et al. |
| 6,294,492 B1 | 9/2001 | Lin |
| 6,348,144 B1 | 2/2002 | Gevelinger |
| 6,358,400 B1 | 3/2002 | Bogdan et al. |
| 6,380,119 B1 | 4/2002 | Grosch et al. |
| 6,406,614 B1 | 6/2002 | Tiedtke et al. |
| 6,410,472 B2 | 6/2002 | Macahan et al. |
| 6,426,052 B1 | 7/2002 | Capelle et al. |
| 6,461,992 B1 | 10/2002 | Sechrist et al. |
| 6,472,340 B2 | 10/2002 | Lin |
| 6,518,470 B1 | 2/2003 | Fukunaga et al. |
| 6,593,264 B2 | 7/2003 | Lin et al. |
| 6,600,082 B2 | 7/2003 | Le Peltier et al. |
| 6,605,566 B2 | 8/2003 | Le Peltier et al. |
| 6,710,002 B2 | 3/2004 | Grosch et al. |
| 6,740,615 B2 | 5/2004 | Zhou |
| 6,784,132 B1 | 8/2004 | Sechrist |
| 6,790,802 B1 | 9/2004 | Sechrist |
| 6,812,180 B2 | 11/2004 | Fukunaga |
| 6,833,338 B2 | 12/2004 | McDaniel et al. |
| 6,881,391 B1 | 4/2005 | Sechrist |
| 6,908,873 B2 | 6/2005 | Zhou et al. |
| 7,037,871 B1 | 5/2006 | Galperin et al. |
| 7,074,975 B2 | 7/2006 | Braun et al. |
| 7,153,801 B2 | 12/2006 | Wu |
| 7,223,710 B1 | 5/2007 | Sechrist |
| 7,312,173 B1 | 12/2007 | Yuan et al. |
| 7,319,175 B2 | 1/2008 | Braun et al. |
| 7,582,272 B2 | 9/2009 | Glova et al. |
| 7,638,101 B2 | 12/2009 | Yuan et al. |
| 7,745,675 B2 | 6/2010 | Ellis et al. |
| 7,868,217 B2 | 1/2011 | Brown et al. |
| 7,932,425 B2 | 4/2011 | Blessing et al. |
| 7,985,381 B2 | 7/2011 | Sun et al. |
| 8,216,522 B2 | 7/2012 | Sun et al. |
| 8,664,144 B2 | 3/2014 | Wu |
| 8,664,145 B2 | 3/2014 | Wu |
| 8,716,161 B2 | 5/2014 | Wu |
| 8,865,608 B2 | 10/2014 | Nabozny et al. |
| 8,912,108 B2 | 12/2014 | Wu |
| 9,174,895 B2 | 11/2015 | Wu |
| 9,387,467 B2 | 7/2016 | Khare |
| 2004/0259719 A1 | 12/2004 | Wu |
| 2005/0027648 A1 | 2/2005 | Knowles et al. |
| 2010/0160147 A1 | 6/2010 | Wu |
| 2010/0160150 A1 | 6/2010 | Wu |
| 2010/0160702 A1 | 6/2010 | Wu |
| 2010/0222202 A1 | 9/2010 | Nabozny et al. |
| 2012/0093699 A1 | 4/2012 | Nabozny et al. |
| 2013/0231511 A1 | 9/2013 | Wu |
| 2013/0231512 A1 | 9/2013 | Wu |
| 2014/0088333 A1 | 3/2014 | Khare |
| 2014/0213839 A1 | 7/2014 | Wu |
| 2015/0073190 A1 | 3/2015 | Wu |
| 2016/0045904 A1 | 2/2016 | Wu |

FOREIGN PATENT DOCUMENTS

| | | |
|---|---|---|
| EP | 0 316 727 | 5/1989 |
| EP | 0 378 482 | 7/1990 |
| EP | 0 294 448 | 8/1991 |
| EP | 0 294 477 | 9/1992 |
| EP | 0 334 562 | 3/1993 |
| EP | 0 535 619 | 4/1993 |
| EP | 0 548 421 | 6/1993 |
| EP | 0 710 502 | 5/1996 |
| EP | 0 872 276 | 10/1998 |
| EP | 0 872 277 | 10/1998 |
| EP | 0 873 785 | 10/1998 |
| FR | 2 325 289 | 4/1977 |
| WO | WO 86/02861 | 5/1986 |
| WO | WO 96/624834 | 8/1996 |
| WO | WO 98/047615 | 10/1998 |
| WO | WO 2010/075133 | 7/2010 |
| WO | WO 2010/075134 | 7/2010 |
| WO | WO 2010/075135 | 7/2010 |

OTHER PUBLICATIONS

Fung S.C., "Deactivation and Regeneration/Redispersion Chemistry of Pt/KL-Zeolite," published in Studies in Surface Science and Catalysis, 2001, vol. 139, pp. 399-406, Elsevier Publisher.

International Search Report and Written Opinion, in Application No. PCT/US2009/068267, dated Jun. 30, 2010, 18 pages.

International Search Report and Written Opinion, in Application No. PCT/US2009/068266, dated May 25, 2010, 17 pages.

International Search Report and Written Opinion, in Application No. PCT/US2009/068268, dated Aug. 26, 2010, 22 pages.

(56) References Cited

OTHER PUBLICATIONS

International Search Report for PCT/US2013/028533 dated Jun. 20, 2013, 4 pages.
International Search Report, PCT/US2013/061370 dated Dec. 13, 2013.
Javier, et al., "Heptane Dehydrocyclization Over Pt/KL Catalysts Doped with Barium or Lanthanum, Catalysis Letters," Nov. 1, 2002 (Nov. 1, 2002), pp. 247-255; New York.
Ko, et al., "Synthesis and Characterization of Zeolite L," published in the Bull. Korean Chem. Soc. 1999, vol. 20, No. 2., 6 pages.

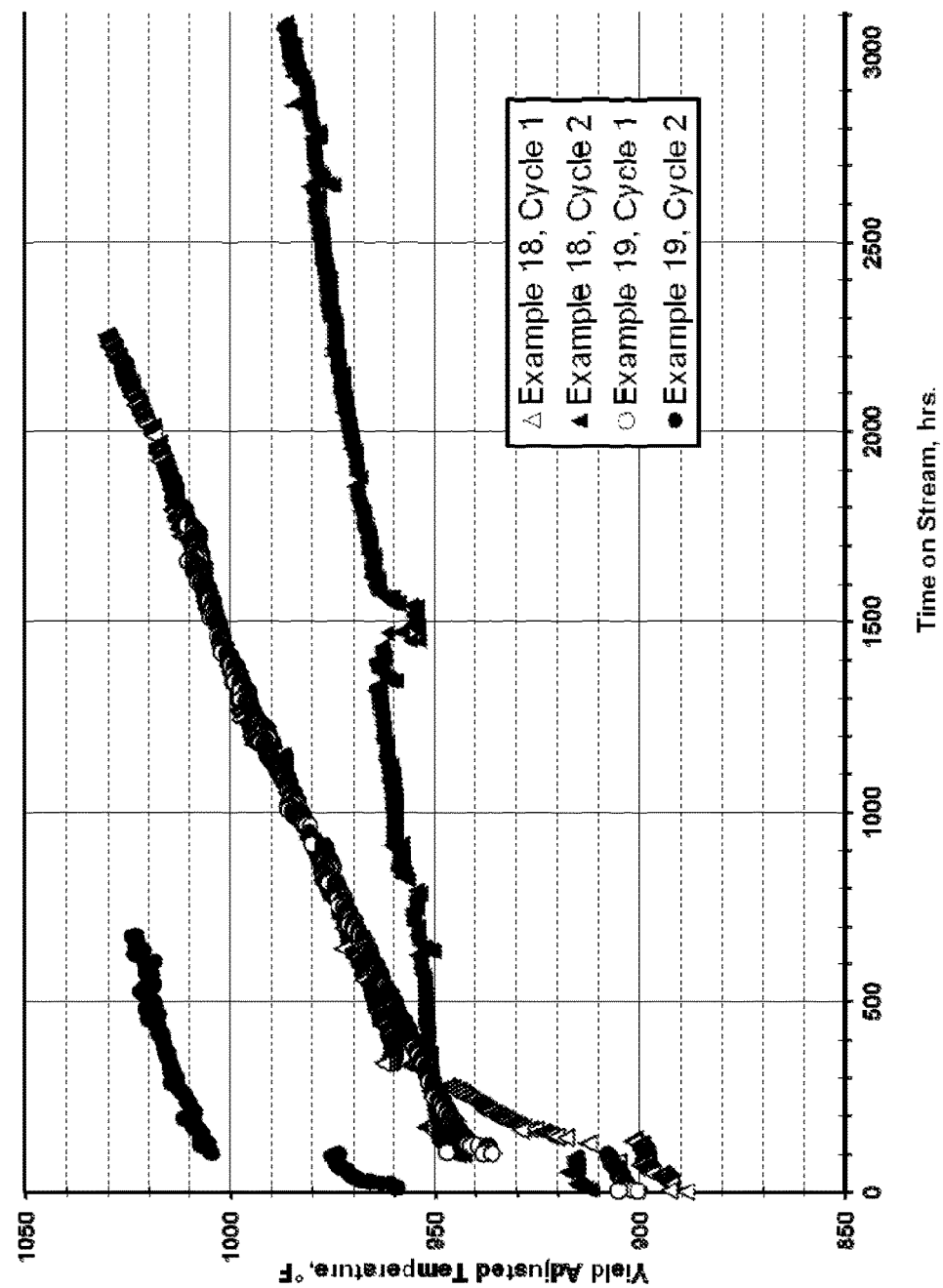

AROMATIZATION CATALYSTS WITH HIGH SURFACE AREA AND PORE VOLUME

REFERENCE TO RELATED APPLICATION

This application is a divisional application of U.S. patent application Ser. No. 13/626,904, filed on Sep. 26, 2012, now U.S. Pat. No. 9,387,467, the disclosure of which is incorporated herein by reference in its entirety.

BACKGROUND OF THE INVENTION

The catalytic conversion of non-aromatic hydrocarbons into aromatic compounds, often referred to as aromatization or reforming, is an important industrial process that can be used to produce benzene, toluene, xylene, and the like. The aromatization or reforming process often is conducted in a reactor system that can contain one or more reactors containing transition metal based catalysts. These catalysts can increase the selectivity to and/or the yield of the desired aromatic compounds. These catalysts also slowly lose their activity over time, often indicated by a loss of the selectivity to desired aromatic compounds and/or a reduction in conversion rates. However, some commercially available catalysts which have high catalyst activity and offer good product selectivity and/or yield are not regenerable. Other commercially available catalysts are regenerable, but often have lower catalyst activity and/or selectivity, as well as higher fouling rates.

Hence, it would be beneficial to have an improved aromatization catalyst which offers high catalyst activity and/or selectivity, low fouling rates, and is regenerable. Accordingly, it is to these ends that the present disclosure is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Catalysts that can be used in aromatization processes are disclosed and described herein. In one embodiment, such catalysts can have a surface area of at least about 165 $m^2/g$, and can comprise (i) an alkaline earth metal exchanged zeolitic support, and (ii) a Group VIII transition metal. In a further embodiment, this catalyst can be substantially free of fluorine.

Methods of producing catalysts also are disclosed herein. One such method of producing a catalyst can comprise (a) contacting a zeolitic base with an alkaline earth metal-containing compound to form an alkaline earth metal exchanged zeolitic support; (b) calcining the alkaline earth metal exchanged zeolitic support at a peak calcining temperature of less than about 550° C. (1022° F.); (c) impregnating the calcined alkaline earth metal exchanged zeolitic support with a Group VIII transition metal-containing compound; and (d) calcining the impregnated alkaline earth metal exchanged zeolitic support to produce a catalyst having a surface area of at least about 165 $m^2/g$.

Also disclosed herein are various processes for reforming hydrocarbons. One such reforming process can comprise contacting a hydrocarbon feed with a supported aromatization catalyst under reforming conditions in a reactor system to produce an aromatic product. In this reforming process, the supported aromatization catalyst can have a surface area of at least about 165 $m^2/g$, and can comprise (i) an alkaline earth metal exchanged zeolitic support, and (ii) a Group VIII transition metal.

Both the foregoing summary and the following detailed description provide examples and are explanatory only. Accordingly, the foregoing summary and the following detailed description should not be considered to be restrictive. Further, features or variations may be provided in addition to those set forth herein. For example, certain embodiments may be directed to various feature combinations and sub-combinations described in the detailed description.

BRIEF DESCRIPTION OF THE FIGURE

FIG. 1 presents a plot of the yield adjusted temperature versus reaction time for Examples 18-19 for a first reaction cycle and a second reaction cycle (after regeneration).

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claim. A "consisting essentially of" claim occupies a middle ground between closed claims that are written in a "consisting of" format and fully open claims that are drafted in a "comprising" format. For example, absent an indication to the contrary, describing a compound or composition as "consisting essentially of" is not to be construed as "comprising," but is intended to describe the recited component that includes materials which do not significantly alter the composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a catalyst system consisting of specific components; alternatively, consisting essentially of specific components; or alternatively, comprising the specific components and other non-recited components.

In this disclosure, while compositions and methods are often described in terms of "comprising" various components or steps, the compositions and methods can also "consist essentially of" or "consist of" the various components or steps, unless stated otherwise.

The terms "a," "an," and "the" are intended to include plural alternatives, e.g., at least one. For instance, the disclosure of "a transition metal," "a zeolitic support," etc., is meant to encompass one, or mixtures or combinations of more than one, transition metal, zeolitic support, etc., unless otherwise specified.

Following long term usage, a catalyst can become deactivated and have unacceptable performance in one or more of catalyst activity, hydrocarbon feed conversion, yield to a desired product(s), selectivity to a desired product(s), or an operating parameter, such as output/production rate or reforming temperature, although the determination that a catalyst is deactivated is not limited only to these features. Generally, once the catalyst performance has become unacceptable, the deactivated catalyst can be replaced with a fresh charge or it can be regenerated (e.g., in-situ regeneration, ex-situ regeneration, etc.). As used herein, a catalyst is considered "regenerable" if one or both of the following two criteria are met. The first criteria is based on the projected cycle length or useful life of the catalyst, as determined in accordance with the procedures described in Examples 18-19. If the fresh catalyst has a cycle length or useful life of "X" hours, then a catalyst is "regenerable" if the cycle length or useful life of the regenerated catalyst is at least 0.5X (i.e., at least 50% of the useful life of the fresh catalyst in its first cycle of use). In certain embodiments disclosed herein, the useful life of a regenerable catalyst can be least 0.65x, at least 0.75x, at least 0.8x, or more. The second criteria is based on the "delta" start of run temperature ($\Delta T_{SOR}$), as determined in accordance with the procedures described in Examples 18-19. A catalyst is "regenerable" if the difference between the start of run temperature of the catalyst after a regeneration and the start of run temperature of the fresh catalyst ($\Delta T_{SOR}$) is less than 30° F. In certain embodiments disclosed herein, the $\Delta T_{SOR}$ can be less than 20° F., less than 15° F., or less than 10° F.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For example, a general reference to pentane, for example, includes n-pentane, 2-methyl-butane, and 2,2-dimethylpropane; and a general reference to a butyl group includes a n-butyl group, a sec-butyl group, an iso-butyl group, and a t-butyl group.

In one embodiment, a chemical "group" can be defined or described according to how that group is formally derived from a reference or "parent" compound, for example, by the number of hydrogen atoms removed from the parent compound to generate the group, even if that group is not literally synthesized in such a manner. These groups can be utilized as substituents or coordinated or bonded to metal atoms. By way of example, an "alkyl group" formally can be derived by removing one hydrogen atom from an alkane. The disclosure that a substituent, ligand, or other chemical moiety can constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedures, unless specified otherwise or the context requires otherwise.

Various numerical ranges are disclosed herein. When Applicants disclose or claim a range of any type, Applicants' intent is to disclose or claim individually each possible number that such a range could reasonably encompass, including end points of the range as well as any sub-ranges and combinations of sub-ranges encompassed therein, unless otherwise specified. As a representative example, Applicants disclose that catalysts provided herein can have a surface area in a range from about 165 to about 225 $m^2/g$ in certain embodiments. By a disclosure that the surface area can be in a range from about 165 to about 225 $m^2/g$, Applicants intend to recite that the surface area can be equal to about 165, about 170, about 175, about 180, about 185, about 190, about 195, about 200, about 205, about 210, about 215, about 220, or about 225 $m^2/g$. Additionally, the surface area can be within any range from about 165 to about 225 $m^2/g$ (for example, the surface area can be in a range from about 170 to about 210 $m^2/g$), and this includes any combination of ranges between about 165 to about 225 $m^2/g$. Likewise, all other ranges disclosed herein should be interpreted in a manner similar to this example.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants can be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants can be unaware of at the time of the filing of the application.

The term "substituted" when used to describe a group, for example, when referring to a substituted analog of a particular group, is intended to describe any non-hydrogen moiety that formally replaces a hydrogen atom in that group, and is intended to be non-limiting. A group or groups can also be referred to herein as "unsubstituted" or by equivalent terms such as "non-substituted," which refers to the original group in which a non-hydrogen moiety does not replace a hydrogen atom within that group. Unless otherwise specified, "substituted" is intended to be non-limiting and include inorganic substituents or organic substituents as understood by one of ordinary skill in the art.

As used herein, the term "hydrocarbon" refers to a compound containing only carbon and hydrogen atoms. Other identifiers can be utilized to indicate the presence of particular groups, if any, in the hydrocarbon (e.g., halogenated hydrocarbon indicates that the presence of one or more halogen atoms replacing an equivalent number of hydrogen atoms in the hydrocarbon).

An "aromatic" compound is a compound containing a cyclically conjugated double bond system that follows the Hückel (4n+2) rule and contains (4n+2) pi-electrons, where n is an integer from 1 to 5. Aromatic compounds include "arenes" (hydrocarbon aromatic compounds, e.g., benzene, toluene, xylene, etc.) and "heteroarenes" (heteroaromatic compounds formally derived from arenes by replacement of one or more methine (—C≡) carbon atoms of the cyclically conjugated double bond system with a trivalent or divalent heteroatoms, in such a way as to maintain the continuous pi-electron system characteristic of an aromatic system and a number of out-of-plane pi-electrons corresponding to the Hückel rule (4n+2)). As disclosed herein, the term "substituted" can be used to describe an aromatic group, arene, or heteroarene, wherein a non-hydrogen moiety formally replaces a hydrogen atom in the compound, and is intended to be non-limiting, unless specified otherwise.

As used herein, the term "alkane" refers to a saturated hydrocarbon compound. Other identifiers can be utilized to indicate the presence of particular groups, if any, in the alkane (e.g., halogenated alkane indicates that the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. The alkane or alkyl group can be linear or branched unless otherwise specified.

A "cycloalkane" is a saturated cyclic hydrocarbon, with or without side chains, for example, cyclobutane, cyclopentane, cyclohexane, methyl cyclopentane, methyl cyclohexane, etc. Other identifiers can be utilized to indicate the presence of particular groups, if any, in the cycloalkane (e.g., halogenated cycloalkane indicates that the presence of one or more halogen atoms replacing an equivalent number of hydrogen atoms in the cycloalkane).

The term "halogen" has its usual meaning. Examples of halogens include fluorine, chlorine, bromine, and iodine.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

DETAILED DESCRIPTION OF THE INVENTION

Disclosed herein are catalysts having high surface area and pore volume, methods for producing such catalysts, and the use of these catalysts in reforming processes.

Catalysts

Consistent with embodiments disclosed herein are catalysts comprising (or consisting essentially of, or consisting of) an alkaline earth metal exchanged zeolitic support, and a Group VIII transition metal. Generally, the features of any of the catalysts disclosed herein (e.g., the zeolitic support, the alkaline earth metal, the Group VIII transition metal, and other compositional aspects; the surface area, total pore volume, and the micropore volume of the catalyst; among others) are independently described herein, and these features can be combined in any combination to further describe the disclosed catalysts.

The catalyst contains an alkaline earth metal exchanged zeolitic support, and the zeolitic support typically can comprise a crystalline inorganic oxide, examples of which can include, but are not limited to, medium and/or large pore zeolites (aluminosilicates), as well as mixtures thereof. Large pore zeolites often can have average pore diameters in a range of from about 7 Å to about 12 Å, and non-limiting examples of large pore zeolites include L-zeolite, Y-zeolite, mordenite, omega zeolite, beta zeolite, and the like. Medium pore zeolites often can have average pore diameters in a range of from about 5 Å to about 7 Å.

The term "zeolite" generally refers to a particular group of hydrated, crystalline metal aluminosilicates. These zeolites exhibit a network of $SiO_4$ and $AlO_4$ tetrahedra in which aluminum and silicon atoms are crosslinked in a three-dimensional framework by sharing oxygen atoms. In the framework, the ratio of oxygen atoms to the total of aluminum and silicon atoms can be equal to 2. The framework exhibits a negative electrovalence that typically can be balanced by the inclusion of cations within the crystal, such as metals, alkali metals, alkaline earth metals, and/or hydrogen.

In some embodiments, the zeolitic support can comprise an L-type zeolite. L-type zeolite supports are a sub-group of zeolitic supports, which can contain mole ratios of oxides in accordance with the formula: $M_{2/n}OAl_2O_3xSiO_2yH_2O$. In this formula, "M" designates an exchangeable cation (one or more) such as barium, calcium, cerium, lithium, magnesium, potassium, sodium, strontium, and/or zinc, as well as non-metallic cations like hydronium and ammonium ions, which may be replaced by other exchangeable cations without causing a substantial alteration of the basic crystal structure of the L-type zeolite. The "n" in the formula represents the valence of "M"; "x" is 2 or greater; and "y" is the number of water molecules contained in the channels or interconnected voids of the zeolite. In one embodiment, the zeolitic support can comprise a potassium L-type zeolite, also referred to as a KL-zeolite, in which the principal cation M incorporated in the zeolite is potassium.

Consistent with embodiments disclosed herein, the zeolite (e.g., a L-zeolite, a KL-zeolite, etc.) can be cation-exchanged with an alkaline earth metal. The resulting zeolitic support, therefore, can comprise an alkaline earth metal, such as barium, strontium, calcium, magnesium, or a combination thereof. In one embodiment, the zeolitic support can comprise barium; alternatively, strontium; alternatively, calcium; or alternatively, magnesium. In another embodiment, the zeolitic support can comprise a barium ion-exchanged L-zeolite.

While not being limited thereto, the catalyst often can comprise from about 0.1 wt. % to about 50 wt. % of the alkaline earth metal (e.g., barium). All weight percentages related to the catalyst are based on the total weight of the dried and calcined catalyst, unless indicated otherwise by the context or specified otherwise. For example, the catalyst can comprise from about 1 wt. % to about 20 wt. %, from about 2 wt. % to about 10 wt. %, or from about 4 wt. % to about 8 wt. %, alkaline earth metal (e.g., barium), based on the total weight of the catalyst.

The zeolitic support can further comprise a binder, for instance, the zeolite can be bound with a binder (or support matrix), and non-limiting examples of binders can include, but are not limited to, inorganic solids oxides, clays, and the like, as well as combinations thereof. The zeolite can be bound with the binder or support matrix as described herein below, or by using any method known in the art. In some embodiments, the binder can comprise alumina, silica, magnesia, boria, titania, zirconia, or a mixed oxide thereof (e.g., an aluminosilicate), or a mixture thereof, while in other embodiments, the binder can comprise a montmorillonite, a kaolin, a cement, or a combination thereof. In a particular embodiment contemplated herein, the binder can comprise silica, alumina, or a mixed oxide thereof alternatively, silica; alternatively, alumina; or alternatively, silica-alumina.

While not being limited thereto, the zeolitic support often can comprise from about 3 wt. % to about 35 wt. % binder. For example, the zeolitic support can comprise from about 5 wt. % to about 30 wt. %, or from about 10 wt. % to about 30 wt. % binder. These weight percentages are based on the total weight of the zeolitic support.

The catalyst can comprise a transition metal, typically a Group VIII transition metal, and non-limiting examples of suitable transition metals can include iron, cobalt, nickel, ruthenium, rhodium, palladium, osmium, iridium, platinum, and the like, or a combination of two or more transition metals. In a particular embodiment, the transition metal can comprise platinum (Pt).

In one embodiment, the catalyst can comprise from about 0.1 wt. % to about 10 wt. % transition metal. In another embodiment, the catalyst can comprise from about 0.2 wt. % to about 5 wt. % transition metal. In yet another embodiment, the catalyst can comprise from about 0.3 wt. % to about 2 wt. % transition metal, or from about 0.5 wt. % to about 2 wt. % transition metal. These weight percentages are based on the total weight of the catalyst.

In circumstances where the transition metal is platinum or comprises platinum, the catalyst can contain from about 0.1 wt. % to about 10 wt. % platinum; alternatively, from about 0.2 wt. % to about 5 wt. % platinum; alternatively, from about 0.3 wt. % to about 2 wt. % platinum; or alternatively, from about 0.5 wt. % to about 2 wt. % platinum. In a particular embodiment contemplated herein, the catalyst can comprise platinum on a zeolitic support comprising a L-zeolite, such as a barium ion-exchanged L-zeolite.

In some embodiments, the catalyst can further comprise chlorine. When present, chlorine can be present in the catalyst in an amount of from about 0.025 wt. % to about 5 wt. %, from about 0.05 wt. % to about 5 wt. %, from about 0.1 wt. % to about 1 wt. %, from about 0.1 wt. % to about 0.8 wt. %, from about 0.1 wt. % to about 0.7 wt. %, from about 0.1 wt. % to about 0.6 wt. %, or from about 0.1 wt. % to about 0.5 wt. %. These weight percentages are based on the total weight of the catalyst.

In other embodiments, however, the catalyst can be substantially free of fluorine. In this context, "substantially free" means less than 2500 ppmw (ppm by weight) of fluorine in the catalyst. Therefore, it is contemplated that the catalyst can contain fluorine in an amount less than 2000 ppmw, less than 1000 ppmw, less than 500 ppmw, less than 100 ppmw, less than 50 ppmw, or less than 25 ppmw, in various embodiments. While not wishing to be bound by theory, Applicants believe that it can be beneficial to have substantially no fluorine present on the catalyst.

Generally, catalysts disclosed herein have a relatively high surface area, often having a surface area of at least about 165 $m^2/g$. In one embodiment, for instance, the catalyst can have a surface area of at least about 170 $m^2/g$, while in another embodiment, the catalyst can have a surface area of at least about 175 $m^2/g$. In yet another embodiment, the catalyst can have a surface area of at least about 180 $m^2/g$. Contemplated ranges for the catalyst surface area can include, but are not limited to, the following ranges: from about 165 to about 250 $m^2/g$, from about 165 to about 225 $m^2/g$, from about 170 to about 220 $m^2/g$, from about 170 to about 210 $m^2/g$, from about 175 to about 225 $m^2/g$, from about 175 to about 210 $m^2/g$, from about 180 to about 220 $m^2/g$, or from about 180 to about 200 $m^2/g$, and the like.

In addition to relatively high surface areas, the catalysts disclosed and described herein can have relatively high pore volumes, often characterized by having total pore volumes of at least about 0.17 cc/g. The total pore volume encompasses pore diameters up to and including 2000 Å. In some embodiments, the catalyst can have a total pore volume of at least about 0.175 cc/g; alternatively, at least about 0.18 cc/g; alternatively, at least about 0.185 cc/g; alternatively, in a range from about 0.17 to about 0.25 cc/g; alternatively, in a range from about 0.17 to about 0.24 cc/g; alternatively, in a range from about 0.175 to about 0.24 cc/g; alternatively, in a range from about 0.18 to about 0.24 cc/g; or alternatively, in a range from about 0.17 to about 0.23 cc/g. Similarly, the catalyst often can have a micropore volume (encompassing pore diameters of less than 20 Å) of at least about 0.045 cc/g, such as, for instance, at least about 0.05, at least about 0.055, or at least about 0.06 cc/g. Typical ranges for the micropore volumes of catalysts disclosed herein can include, but are not limited to, the following ranges: from about 0.045 to about 0.09 cc/g, from about 0.05 to about 0.09 cc/g, from about 0.055 to about 0.085 cc/g; from about 0.06 to about 0.09 cc/g, from about 0.05 to about 0.08 cc/g, or from about 0.055 to about 0.08 cc/g. In an embodiment, the catalyst can be characterized by a $T_{SOR}$ of less than about 499° C. (930° F.), or less than about 496° C. (925° F.). In another embodiment, the catalyst can be characterized by a Fouling Rate (FR) of less than about 0.28° C./hr (0.5° F./hr), or less than about 0.25° C./hr (0.45° F./hr). In yet another embodiment, the catalyst can be characterized by having a $C_5+$ yield of greater than about 90 wt. %, or greater than about 91 wt. %. The test procedures for these parameters are discussed in greater detail in reference to Examples 1-17 that follow.

In another embodiment, and unexpectedly, the catalysts disclosed herein can be regenerated. As discussed hereinabove, a catalyst is regenerable (a) if the cycle length or useful life of the regenerated catalyst is at least 0.5X (50% of X), wherein X is the cycle length or useful life (in hours) of the fresh catalyst, and/or (b) if $\Delta T_{SOR}$ is less than 30° F., wherein $\Delta T_{SOR}$ is the difference between the start of run temperature of the catalyst after regeneration and the start of run temperature of the fresh catalyst. Both of these parameters and procedures for determining these parameters are discussed in greater detail in reference to Examples 18-19 that follow.

Consistent with some embodiments disclosed herein, the useful life of the regenerated catalyst can be least 0.65X, or at least 0.75X, while in accordance with other embodiments, the useful life of the regenerated catalyst can be at least 0.8X, or at least X. Additionally or alternatively, the $\Delta T_{SOR}$ can be less than 25° F., or less than 20° F., or less than 15° F., or less than 10° F.

Methods for Producing Catalysts

Various methods for producing catalysts comprising a Group VIII transition metal and an alkaline earth metal exchanged zeolitic support are provided herein. One such method for making a catalyst can comprise (or consist essentially of, or consist of):

(a) contacting a zeolitic base with an alkaline earth metal-containing compound to form an alkaline earth metal exchanged zeolitic support;

(b) calcining the alkaline earth metal exchanged zeolitic support at a peak calcining temperature of less than about 550° C. (1022° F.);

(c) impregnating the calcined alkaline earth metal exchanged zeolitic support with a Group VIII transition metal-containing compound; and (d) calcining the impregnated alkaline earth metal exchanged zeolitic support to produce a catalyst having a surface area of at least about 165 m²/g.

Generally, the features of any of the methods disclosed herein (e.g., the zeolitic base, the alkaline earth metal-containing compound, the Group VIII transition metal-containing compound, various compositional aspects of the finished catalyst, the surface area, total pore volume, and micropore volume of the finished catalyst, the conditions under which any of the steps are conducted, the peak calcining temperature, among others) are independently described herein, and these features can be combined in any combination to further describe the disclosed methods. Moreover, other process steps can be conducted before, during, and/or after any of the steps listed in the disclosed methods, unless stated otherwise. Additionally, catalysts (e.g., supported aromatization catalysts) produced in accordance with the disclosed methods/processes are within the scope of this disclosure and are encompassed herein.

In step (a), the alkaline earth metal-containing compound can contain any alkaline earth metal, such as barium, strontium, calcium, magnesium, or a combination thereof. In one embodiment, the alkaline earth metal-containing compound can comprise barium; alternatively, strontium; alternatively, calcium; or alternatively, magnesium. In another embodiment, the alkaline earth metal-containing compound can comprise a salt of the alkaline earth metal, such as an acetate, carbonate, nitrate, or halide (e.g., chloride) salt. In yet another embodiment, the alkaline earth metal-containing compound can comprise a water soluble barium salt, non-limiting examples of which can include barium nitrate, barium chloride, barium acetate, barium carbonate, and the like, as well as mixtures or combinations thereof. Generally, the alkaline earth metal-containing compound in step (a) can be in an aqueous solution, and can be contacted with the zeolitic base in an ion exchange process.

The zeolitic base in step (a) often can comprise a zeolite, such as any zeolite disclosed herein (e.g., a L-zeolite, a KL-zeolite, etc.). While not being limited thereto, the zeolitic base in step (a) can be produced by a process comprising mixing a zeolite, such as a KL-zeolite, with a binder, such as silica, then extruding the mixture, and then drying and calcining. Methods for producing a zeolitic base are described, for example, in U.S. Pat. No. 6,190,539, the disclosure of which is incorporated herein by reference in its entirety. Optionally, the resultant calcined zeolitic base can be washed, dried, and calcined prior to step (a). In a particular embodiment, the zeolitic base in step (a) can comprise a silica-bound KL-zeolite.

In various embodiments contemplated herein, the methods of making a catalyst can further include one or more optional steps performed after step (a), but prior to the calcination of the zeolitic support in step (b). For example, a method of making a catalyst can further comprise an intermediate washing step prior to step (b), and/or can further comprise an intermediate drying step prior to step (b). These optional steps are discussed in greater detail herein below. In one embodiment, at least one of these optional steps can be performed in a method of making a catalyst, while in another embodiment, both of these optional steps can be performed. The optional steps can be performed in any order, however, in a particular embodiment, the intermediate washing step can be performed first, followed by the intermediate drying step.

In an embodiment, a method of making a catalyst (e.g., comprising a Group VIII transition metal and a zeolitic support) can further comprise an intermediate washing step prior to the calcination in step (b). This intermediate washing step generally can comprise contacting (e.g., mixing) the alkaline earth metal exchanged zeolitic support with a washing composition comprising (or consisting essentially of, or consisting of) water, for instance, distilled or deionized water. Catalyst washing procedures are described, for example, in U.S. Pat. No. 6,190,539, the disclosure of which is incorporated herein by reference in its entirety.

While not being limited thereto, the washing step generally can be conducted at a washing temperature in a range from about 20° C. to about 95° C.; alternatively, from about 20° C. to about 90° C.; alternatively, from about 25° C. to about 75° C.; alternatively, from about 25° C. to about 65° C.; alternatively, from about 30° C. to about 90° C.; or alternatively, from about 30° C. to about 60° C. In these and other embodiments, these temperature ranges also are meant to encompass circumstances where the washing step is conducted at a series of different temperatures, instead of at a single fixed temperature, falling within the respective ranges.

The intermediate washing step can include numerous washing cycles, often from 2 to 20, or from 2 to 10. More often, the intermediate washing step can consist of from 2 to 8, from 3 to 8, or from 3 to 5 washing cycles.

The duration of each washing cycle in the intermediate washing step is not limited to any particular period of time. Typically, each washing cycle can be conducted in a time period ranging from as little as 10 sec to as long as 2 hr (or more), but more typically, each washing cycle can be conducted in a time period that can be in a range from about 30 sec to about 1 hr, such as, for example, from about 1 min to about 45 min, from about 1 min to about 30 min, from about 5 min to about 1 hr, or from about 10 min to about 30 min.

In an embodiment, a method of making a catalyst (e.g., comprising a Group VIII transition metal and a zeolitic support) can further comprise an intermediate drying step prior to the calcination in step (b). This intermediate drying step generally can comprise contacting the alkaline earth metal exchanged zeolitic support with an intermediate drying gas stream comprising (or consisting essentially, or consisting of) an inert gas (e.g., nitrogen), oxygen, air, or any mixture or combination thereof; alternatively, nitrogen; alternatively, helium; alternatively, neon; alternatively, argon; alternatively, oxygen; or alternatively, air.

While not being limited thereto, the intermediate drying step generally can be conducted at an intermediate drying temperature in a range from about 80° C. to about 200° C.; alternatively, from about 100° C. to about 200° C.; alternatively, from about 100° C. to about 175° C.; alternatively, from about 100° C. to about 150° C.; alternatively, from about 105° C. to about 165° C.; or alternatively, from about 110° C. to about 140° C. In these and other embodiments, these temperature ranges also are meant to encompass circumstances where the drying step is conducted at a series of different temperatures, instead of at a single fixed temperature, falling within the respective ranges.

The duration of the intermediate drying step is not limited to any particular period of time. Typically, the drying step can be conducted in a time period ranging from as little as 30 min to as long as 8 hr (or more), but more typically, the drying step can be conducted in a time period that can be in a range from about 1 hr to about 8 hr, such as, for example, from about 1 hr to about 7 hr, from about 1 hr to about 6 hr, from about 2 hr to about 7 hr, or from about 2 hr to about 6 hr.

The calcination of the alkaline earth metal exchanged zeolitic support in step (b) can be conducted at a variety of temperatures and time periods. However, and unexpectedly, Applicants determined that it can be beneficial for the performance of the resultant catalyst for the peak calcining temperature to be less than about 550° C. (1022° F.). In one embodiment, the peak calcining temperature in step (b) can be in a range from about 315° C. (600° F.) to about 538° C. (1000° F.). In another embodiment, the peak calcining temperature can be in a range from about 371° C. (700° F.) to about 500° C. (932° F.). In yet another embodiment, the peak calcining temperature can be in a range from about 399° C. (750° F.) to about 493° C. (920° F.). In still another embodiment, the peak calcining temperature can be in a range from about 427° C. (800° F.) to about 482° C. (900° F.). In these and other embodiments, these temperature ranges also are meant to encompass circumstances where the calcination step is conducted at a series of different temperatures (e.g., an initial calcination temperature, a peak calcination temperature), instead of at a single fixed temperature, falling within the respective ranges. For instance, the calcination in step (b) can start at an initial temperature which is the same as the drying temperature in the intermediate drying step. Subsequently, the temperature of the step (b) calcination can be increased to a peak calcining temperature, for example, in a range from about 315° C. (600° F.) to about 538° C. (1000° F.), or from about 371° C. (700° F.) to about 500° C. (932° F.).

The duration of the calcining in step (b) is not limited to any particular period of time. Hence, the calcining can be conducted, for example, in a time period ranging from as little as 30-45 min to as long as 10-12 hr, or more. The appropriate calcining time can depend upon, for example, the initial/peak calcining temperature, whether an intermediate drying step is used, among other variables. Generally, however, the calcining step can be conducted in a time period that can be in a range from about 45 min to about 12 hr, such as, for example, from about 1 hr to about 12 hr, from about 1 hr to about 10 hr, from about 1 hr to about 5 hr, or from about 1 hr to about 3 hr.

The calcining in step (b) can be conducted in a calcining gas stream that comprises (or consists essentially, or consists of) an inert gas (e.g., nitrogen), oxygen, air, or any mixture or combination thereof. In some embodiments, the calcining gas stream can comprise air, while in other embodiments, the calcining gas stream can comprise a mixture of air and nitrogen. Yet, in certain embodiments, the calcining gas stream can be an inert gas, such as nitrogen and/or argon.

In step (c), the calcined alkaline earth metal exchanged zeolitic support of step (b) can be impregnated with a Group VIII transition metal-containing compound. The Group VIII transition metal-containing compound can comprise iron, cobalt, nickel, ruthenium, rhodium, palladium, osmium, iridium, platinum, and the like, or a combination of two or more transition metals. In a particular embodiment, the Group VIII transition metal-containing compound can comprise platinum (Pt). Illustrative and non-limiting examples of Group VIII transition metal-containing compounds (e.g., which contain platinum) that are suitable for use in impregnating the zeolitic support with platinum include, but are not limited to, tetraamineplatinum(II) chloride, tetraamineplatinum(II) nitrate, platinum(II) acetylacetonate, platinum(II) chloride, ammonium tetrachloroplatinate(II), chloroplatinic acid, and the like, as well as mixtures of combinations thereof.

In an embodiment, a method of making a catalyst (e.g., comprising a Group VIII transition metal and a zeolitic support) can further comprise a final drying step prior to the calcination in step (d). This final drying step generally can comprise contacting the impregnated zeolitic support with a final drying gas stream comprising (or consisting essentially, or consisting of) an inert gas (e.g., nitrogen), oxygen, air, or any mixture or combination thereof alternatively, nitrogen; alternatively, helium; alternatively, neon; alternatively, argon; alternatively, oxygen; or alternatively, air.

As with the intermediate drying step, the final drying step is not limited to particular final drying temperatures, but most often, the final drying temperature can be in a range from about 80° C. to about 200° C.; alternatively, from about 100° C. to about 200° C.; alternatively, from about 100° C. to about 175° C.; alternatively, from about 100° C. to about 150° C.; alternatively, from about 105° C. to about 165° C.; or alternatively, from about 110° C. to about 140° C. In these and other embodiments, these temperature ranges also are meant to encompass circumstances where the final drying step is conducted at a series of different temperatures, instead of at a single fixed temperature, falling within the respective ranges.

The duration of the final drying step can in the same range of time periods as the intermediate drying step, e.g., from as short as 30 min to as long as 8 hr (or more), but more typically, the final drying step can be conducted in a time period that can be in a range from about 1 hr to about 8 hr, such as, for example, from about 1 hr to about 7 hr, from about 1 hr to about 6 hr, from about 2 hr to about 7 hr, or from about 2 hr to about 6 hr.

The calcination of the impregnated alkaline earth metal exchanged zeolitic support in step (d) can be conducted at a variety of temperatures and time periods. In one embodiment, the peak calcining temperature in step (d) can be in a range from about 200° C. to about 500° C. (1000° F.). In another embodiment, the peak calcining temperature in step (d) can be in a range from about 230° C. to about 400° C. In yet another embodiment, the peak calcining temperature in step (d) can be in a range from about 230° C. to about 350° C. In still another embodiment, the peak calcining temperature in step (d) can be in a range from about 200° C. to about 300° C. In these and other embodiments, these temperature ranges also are meant to encompass circumstances where the step (d) is conducted at a series of different temperatures (e.g., an initial calcination temperature, a peak calcination temperature), instead of at a single fixed temperature, falling within the respective ranges. For instance, the calcination in step (d) can start at an initial temperature which is the same as the final drying temperature in the final drying step. Subsequently, the temperature of the step (d) calcination can be increased to a peak calcining temperature, for example, in a range from about 230° C. to about 500° C., or from about 230° C. to about 350° C.

The duration of the calcining in step (d) is not limited to any particular period of time, and generally can be in the same range of time periods as in step (b). Hence, the calcining of step (d) can be conducted, for example, in a time period ranging from as little as 30-45 min to as long as 10-12 hr, or more. The appropriate calcining time can depend upon, for example, the initial/peak calcining temperature, whether a final drying step is used, among other variables. Generally, however, the calcining of step (d) can be conducted in a time period that can be in a range from about 45 min to about 12 hr, such as, for example, from about 1 hr to about 12 hr, from about 1 hr to about 10 hr, from about 1 hr to about 5 hr, or from about 1 hr to about 3 hr.

In various embodiments contemplated herein, the methods of making a catalyst can further include one or more optional final steps performed after the calcination in step (d). For example, a method of making a catalyst can further comprise a reducing step after the step (d). This reducing step can comprise contacting the catalyst with a reducing gas stream comprising molecular hydrogen. In addition to molecular hydrogen, the reducing gas stream can comprise an inert gas, i.e., the reducing gas stream can comprise (or consist essentially of, or consist of) molecular hydrogen and an inert gas. Typical inert gasses useful in the reducing step can encompass helium, neon, argon, nitrogen, and the like, and this includes combinations of two or more of these materials. In certain embodiments, the reducing gas stream can comprise (or consist essentially of, or consist of) molecular hydrogen and nitrogen.

The reducing step can be conducted at a variety of temperatures and time periods. For instance, the reducing step can be conducted at a peak reducing temperature in a range from about 100° C. to about 600° C.; alternatively, from about 100° C. to about 550° C.; alternatively, from about 200° C. to about 500° C.; alternatively, from about 300° C. to about 550° C.; alternatively, from about 200° C. to about 400° C.; or alternatively, from about 200° C. to about 350° C. In these and other embodiments, these temperature ranges also are meant to encompass circumstances where the reducing step is conducted at a series of different temperatures (e.g., an initial reducing temperature, a peak reducing temperature), instead of at a single fixed temperature, falling within the respective ranges.

The duration of the reducing step is not limited to any particular period of time. Hence, the reducing step can be conducted, for example, in a time period ranging from as little as 30 min to as long as 24 hr, or more. For example, the reducing step can be conducted in a time period that can be in a range from about 1 hr to about 24 hr, from about 2 hr to about 18 hr, from about 2 hr to about 8 hr, from about 1 hr to about 10 hr, or from about 1 hr to about 6 hr.

The method of making a catalyst, as described by steps (a) through (d) hereinabove, can be further characterized, in some embodiments, as not including a contacting step between step (b) and step (c). For example, in this regard, there is no additional contacting of the calcined alkaline earth metal exchanged zeolitic support with an alkaline earth metal-containing compound prior to impregnation of the zeolitic support with a Group VIII transition metal-containing compound. In a further embodiment, step (a) can be the only step in the method which utilizes an alkaline earth metal-containing compound, for example, a barium-containing compound.

In another embodiment, the method can be characterized as not including a contacting step comprising a fluorine-containing compound; additionally or alternatively, the method can be characterized as not including a contacting step comprising a chlorine-containing compound other than the Group VIII transition metal-containing compound (e.g., a platinum-containing compound). Chlorine-containing compounds in these embodiments can include, but are not limited to, hydrochloric acid, chlorine gas ($Cl_2$), carbon tetrachloride, tetrachloroethylene, chlorobenzene, methyl chloride, methylene chloride, chloroform, allyl chloride, trichloroethylene, a chloramine, a chlorine oxide, a chlorine acid, chlorine dioxide, dichlorine monoxide, dichlorine heptoxide, chloric acid, perchloric acid, ammonium chloride, tetramethylammonium chloride, tetraethylammonium chloride, tetrapropylammonium chloride, tetrabutylammonium chloride, methyltriethylammonium chloride, and the like, or any combination thereof. Suitable fluorine-containing compounds in these embodiments can include, but are not limited to, hydrofluoric acid, fluorine gas ($F_2$), 2,2,2-trifluoroethanol, tetrafluoroethylene, carbon tetrafluoride, carbon trifluoride, fluoromethane, heptafluoropropane, decafluorobutane, hexafluoroisopropanol, tetrafluoropropanol, pentafluoropropanol, hexafluorophenylpropanol, perfluorobutyl alcohol, hexafluor-2-propanol, pentafluoro-1-propanol, tetrafluoro-1-propanol, 1,1,1,3,3,3-hexafluoro-2-propanol, 2,2,3,3,3-pentafluoro-1-propanol, ammonium fluoride, tetramethylammonium fluoride, tetraethylammonium fluoride, tetrapropylammonium fluoride, tetrabutylammonium fluoride, methyltriethylammonium fluoride, and the like, or any combination thereof. Compounds which can be considered as chlorine-containing compounds and/or fluorine-containing compounds in these embodiments can include, but are not limited to, $CF_3Cl$, $CF_2Cl_2$, $CFCl_3$, $CHFCl_2$, $CHF_2Cl$, $C_2F_2Cl_4$, $C_2F_4Cl_2$, and the like, or any combination thereof.

Reforming Processes with Aromatization Catalysts

Also encompassed herein are various processes for reforming hydrocarbons. One such reforming process can comprise (or consist essentially of, or consist of) contacting a hydrocarbon feed with a supported aromatization catalyst under reforming conditions in a reactor system to produce an aromatic product. The supported aromatization catalyst can have a surface area of at least about 165 $m^2/g$, and can comprise (i) an alkaline earth metal exchanged zeolitic support; and (ii) a Group VIII transition metal.

Generally, the features of any of the processes disclosed herein (e.g., the hydrocarbon feed, the supported aromatization catalyst, the Group VIII transition metal, the zeolitic support, the reforming conditions, among others) are independently described herein, and these features can be combined in any combination to further describe the disclosed reforming processes. Moreover, other process steps can be conducted before, during, and/or after the step of contacting the hydrocarbon feed with the supported aromatization catalyst under reforming conditions in the reactor system to produce the aromatic product, unless stated otherwise.

The reactor systems for reforming and the respective reforming conditions are well known to those of skill in the art and are described, for example, in U.S. Pat. Nos. 4,456,527, 5,389,235, 5,401,386, 5,401,365, 6,207,042, and 7,932,425, the disclosures of which are incorporated herein by reference in their entirety.

Likewise, typical hydrocarbon feeds are disclosed in these references. Often, the hydrocarbon feed can be a naptha stream or light naptha stream. In certain embodiments, the hydrocarbon feed can comprise non-aromatic hydrocarbons, for example, the hydrocarbon feed can comprise $C_6$-$C_9$ alkanes and/or cycloalkanes, or $C_6$-$C_8$ alkanes and/or cycloalkanes (e.g., hexane, cyclohexane, etc.), and the like.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

In Examples 1-17, the respective catalysts were evaluated for their start of run temperature ($T_{SOR}$, ° F.), fouling rate (FR, ° F./hr), and $C_5+$ yield (wt. %) in accordance with the following procedure. Approximately 0.7 g of each catalyst were placed in a ¼-inch OD stainless steel reactor vessel in a temperature controlled furnace. Each catalyst sample was dried and reduced under flowing molecular hydrogen without recycle at a temperature increasing from room temperature to about 950° F. for 1 hr. Then, a feed stream of aliphatic hydrocarbons and molecular hydrogen was added to the reactor vessel at a feed rate of about 12 mL/min, a liquid hourly space velocity (LHSV) of about 12 hr$^{-1}$, a $H_2$:hydrocarbon molar ratio of about 1.3:1, and a pressure of about 100 psig, to obtain catalyst performance data over time. The aliphatic hydrocarbon feed contained from 22 to 26 wt. % n-hexane, 4 to 8 wt. % n-heptane, 33 to 37 wt. % $C_6$ iso-paraffins, 17 to 21 wt. % $C_7$ iso-paraffins, 6 to 10 wt. % $C_8$ iso-paraffins, with the balance attributable to $C_6$ and $C_7$ olefins, naphthenes, and aromatics. The reactor effluent composition was regularly analyzed by gas chromatography to determine the weight percentage of total aromatics in the $C_5+$ fraction (e.g., benzene, toluene). The reactor temperature was periodically adjusted to achieve a desired total 63 wt. % aromatics in the $C_5+$ product. Each test was conducted for 40 hr.

As would be recognized by those of skill in the art, catalysts decrease in activity during operation over time due to several reasons, for example, deposition of coke, undesirable accumulation of poisons on the catalyst surface, etc. This deactivation is generally referred to as "fouling," and the fouling rate can be determined by establishing a temperature needed to achieve a targeted conversion of the hydrocarbon feed to a selected wt. % of aromatics in the $C_5+$ product. As the catalyst activity decreases due to fouling, the temperature may be increased to compensate for the loss of catalyst activity. The extent to which the temperature is adjusted over a specified time period to maintain the targeted activity is termed the fouling rate. In Examples 1-17, the temperature required to maintain 63 wt. % aromatics (the yield adjusted temperature) was plotted versus reaction time, and a linear regression fit was used to determine FR and $T_{SOR}$ using the formula, y=FR*t+$T_{SOR}$, where y is the yield adjusted temperature, FR is the fouling rate (slope), t is the reaction time, and $T_{SOR}$ is the initial start of run temperature (y-intercept). Initial low conversion catalyst break-in conditions or initial performance, typically within the first 15 hr, were not included in the determination of $T_{SOR}$ and fouling rate.

The $C_5+$ yield (wt. %) was determined by analyzing the reaction product stream using a gas chromatograph equipped with a capillary column and a flame ionization detector. Samples were taken every hour and analyzed. All measured $C_5$ to $C_{10}$ components (in wt. %) and the amount of hydrogen produced (calculated from the difference between the feed and the reaction product) were used to calculate total $C_5+$ yield, based on the total reaction product. The values reported in Tables I-IV were the average $C_5+$ yield between 30-40 hours on stream in the 40-hr test.

Weight percentages of Pt, Ba, Cl, and F were determined using X-ray fluorescence (XRF). Surface areas were determined using the BET method, and pore volume and micropore volume were determined using the t-plot method.

Examples 1-4

Example 1 was a comparative, commercially available aromatization catalyst containing platinum on a Ba-KL zeolite with about 20 wt. % silica binder. Beneficially, this catalyst is regenerable, but often has lower catalyst activity and higher fouling rates than Example 2. Example 2 was a comparative, commercially available aromatization catalyst containing platinum and halogens (F and Cl) on a KL zeolite with about 17 wt. % silica binder. Beneficially, this catalyst generally has higher catalyst activity and lower fouling rates than Example 1, but this catalyst typically is not regenerable.

Examples 3-4 were produced as follows. An extruded base was prepared by extruding a mixture of 83 wt. % KL zeolite and 17 wt. % colloidal silica with 5 wt. % methyl cellulose (based on the zeolite) in a sufficient amount of water to make an extrudable paste, and then extruding the paste through a die to produce ¹⁄₁₆-inch extrudates. The wet extrudates were dried at about 250° F. for 4 hr, and then calcined at 932° F. for 1 hr in flowing air. The calcined base was washed 3 times in deionized water at 100° F. for 20 min, followed by drying at about 250° F. for 4 hr, and then calcining at 900-950° F. for 1 hr in flowing air. Next, the calcined and washed base was ion-exchanged with a 0.3 M aqueous solution of barium nitrate at a temperature of about 180° F. for about 3 hr, followed by filtration to remove excess barium nitrate solution. The barium exchanged support was washed 3 times in deionized water at about 75° F. for 20 min, filtered, and then dried at about 250° F. for about 4 hr. Calcining was conducted at a peak temperature of 900-950° F. for 1 hr.

Approximately 20 g of the calcined barium exchanged support were impregnated with an aqueous solution of $Pt(NH_3)_4Cl_2$ (about 0.4 g of the platinum-containing compound to 9.5 mL of water) to result in the desired platinum loadings. The catalyst was dried in vacuum at 100° F. for 2 hr, then at 200° F. for 30 min, and then calcined at 500° F. for 1 hr in flowing air.

Table I summarizes certain properties of the aromatization catalysts of Examples 1-4. As compared with the catalyst of Example 1, the catalysts of Examples 3-4, unexpectedly, had significantly higher surface area, total pore volume, and micropore volume, as well as increased catalyst activity as demonstrated by both a lower $T_{SOR}$ temperature and a higher $C_5+$ yield. Moreover, the catalysts of Examples 3-4 had significantly lower fouling rates than that of Example 1.

As compared with the catalyst of Example 2, the catalysts of Examples 3-4 had relatively similar surface area, total pore volume, and micropore volume. Surprisingly, even with 20% less platinum that the catalyst of Example 2, the catalysts of Examples 3-4 showed relatively similar fouling rates and $T_{SOR}$ temperatures. Interestingly, the catalysts of Examples 3-4 resulted in slightly superior $C_5+$ yields than the catalyst of Example 2.

TABLE I

| Examples 1-4. | | | | |
|---|---|---|---|---|
| Example | 1 | 2 | 3 | 4 |
| Pt (wt. %) | 0.57 | 0.98 | 0.79 | 0.72 |
| Ba (wt. %) | 6.24 | 0.0 | 6.53 | 6.63 |
| Surface Area (m²/g) | 114 | 180 | 208 | 182 |
| Total Pore Volume (cc/g) | 0.170 | 0.194 | 0.200 | 0.190 |
| Micropore Volume (cc/g) | 0.043 | 0.063 | 0.069 | 0.058 |
| $T_{SOR}$ (° F.) | 933 | 914 | 914 | 916 |
| Fouling Rate (° F./hr) | 2.50 | 0.12 | 0.28 | 0.27 |
| $C_5+$ Yield (wt. %) | 83.3 | 90.5 | 91.2 | 91.1 |

Examples 5-8

The catalysts of Examples 5-6 were the same as the catalysts of Examples 1-2, respectively, but are given different example numbers due to slight variations in test results versus Examples 1-2.

Examples 7-8 were produced as follows. An extruded base was prepared by extruding a mixture of 83 wt. % KL zeolite and 17 wt. % colloidal silica with 5 wt. % methyl cellulose (based on the zeolite) in a sufficient amount of water to make an extrudable paste. The wet extrudates were dried at about 250° F. for 4 hr, and then calcined at 932° F. for 1 hr in flowing air. The calcined base was washed 3 times in deionized water at 100° F. for 20 min, followed by drying at about 250° F. for 4 hr, and then calcining at 900° F. for 1 hr in flowing air. Approximately 300 g of the calcined and washed base were ion-exchanged with 3 L of a 0.3 M aqueous solution of barium nitrate at a temperature of about 180° F. for about 3 hr with occasional stirring, followed by filtration to remove excess barium nitrate solution. The barium exchanged support was washed 3 times in 750 mL of deionized water at about 75° F. for 20 min, filtered, and then dried at about 250° F. for about 4 hr. Calcining was conducted at a peak temperature of 900° F. for 1 hr.

Approximately 120 g of the calcined barium exchanged support were impregnated with an aqueous solution of $Pt(NH_3)_4Cl_2$ (e.g., 2.88 g in 60 mL of water) to result in the desired platinum loadings. The catalyst was dried in vacuum at 100° F. for 2 hr, then at 200° F. for 30 min, and then calcined at 500° F. for 1 hr in flowing air.

Table II summarizes certain properties of the aromatization catalysts of Examples 5-8. As compared with the catalyst of Example 5, the catalysts of Examples 7-8, unexpectedly, had significantly higher surface area, total pore volume, and micropore volume, as well as increased catalyst activity as demonstrated by both a lower $T_{SOR}$ temperature and a higher $C_5+$ yield. Moreover, the catalysts of Examples 7-8 had significantly lower fouling rates than that of Example 5.

As compared with the catalyst of Example 6, the catalysts of Examples 7-8 contained barium, did not contain fluorine, and contained about half of the amount of chlorine. The catalysts of Examples 7-8 had slightly higher surface areas, and comparable total pore volumes and micropore volumes to the catalyst of Example 6. Additionally, the catalysts of Examples 7-8 showed relatively similar fouling rates, $T_{SOR}$ temperatures, and $C_5+$ yields as compared to the catalyst of Example 2.

TABLE II

| Examples 5-8. | | | | |
|---|---|---|---|---|
| Example | 5 | 6 | 7 | 8 |
| Pt (wt. %) | 0.57 | 0.98 | 0.80 | 0.94 |
| Ba (wt. %) | 6.24 | 0.0 | 6.49 | 6.48 |
| F (wt. %) | 0.0 | 0.80 | 0.0 | 0.0 |
| Cl (wt. %) | 0.27 | 0.83 | 0.34 | 0.42 |
| Surface Area (m²/g) | 114 | 180 | 193 | 194 |
| Total Pore Volume (cc/g) | 0.170 | 0.194 | 0.192 | 0.228 |
| Micropore Volume (cc/g) | 0.043 | 0.063 | 0.065 | 0.064 |
| $T_{SOR}$ (° F.) | 933 | 923 | 926 | 916 |
| Fouling Rate (° F./hr) | 2.50 | 0.16 | 0.46 | 0.34 |
| $C_5+$ Yield (wt. %) | 83.3 | 90.4 | 90.1 | 91.2 |

Example 9-12

The catalysts of Examples 9-12 each contained approximately 1% platinum, and were prepared in substantially the same manner as those of Examples 7-8. The barium exchanged support was calcined at a peak temperature of either 800° F., 900° F., 1100° F., or 1200° F. for 1 hr, prior to impregnating with platinum.

Table III summarizes the calcination temperature used in the preparation of each of Examples 9-12, as well as certain properties of the aromatization catalysts of Examples 9-12. The peak calcinations temperatures of 800° F. and 900° F. produced catalysts with the highest surface areas, total pore volumes, and micropore volumes, as well the lowest $T_{SOR}$ temperature and fouling rates. The peak calcination temperature of 1200° F. produced a catalyst which had an unacceptably high fouling rate and low $C_5+$ yield.

Examples 13-17

The catalysts of Examples 13-17 each contained approximately 1.2% platinum, and were prepared in substantially the same manner as those of Examples 7-8. The barium exchanged support was calcined at a peak temperature of either 600° F., 700° F., 800° F., 900° F., or 1000° F. for 1 hr, prior to impregnating with platinum.

Table IV summarizes the calcination temperature used in the preparation of each of Examples 13-17, as well as certain properties of the aromatization catalysts of Examples 13-17. All of these catalysts, produced with peak calcinations temperatures of 600° F. to 1000° F., had acceptable surface areas, pore volumes, micropore volumes, $T_{SOR}$ temperatures, fouling rates, and $C_5+$ yields.

TABLE III

| Examples 9-12 with 1 wt. % platinum. | | | | | | |
|---|---|---|---|---|---|---|
| Example | Peak Calcining (° F.) | Surface Area (m²/g) | Micro-Pore Volume (cc/g) | Total Pore Volume (cc/g) | $T_{SOR}$ (° F.) | Fouling Rate (° F./hr) | $C_5+$ Yield (wt. %) |
| 9 | 800 | 198 | 0.068 | 0.200 | 927 | 0.42 | 91.3 |
| 10 | 900 | 179 | 0.070 | 0.190 | 929 | 0.38 | 91.4 |
| 11 | 1100 | 161 | 0.056 | 0.170 | 934 | 0.49 | 91.4 |
| 12 | 1200 | 151 | 0.049 | 0.160 | 952 | 3.10 | 78.4 |

TABLE IV

Examples 13-17 with 1.2 wt. % platinum.

| Example | Peak Calcining (° F.) | Surface Area (m²/g) | Micro-Pore Volume (cc/g) | Total Pore Volume (cc/g) | $T_{SOR}$ (° F.) | Fouling Rate (° F./hr) | $C_5$+ Yield (wt. %) |
|---|---|---|---|---|---|---|---|
| 13 | 600 | 190 | 0.063 | 0.22 | 915 | 0.29 | 87.6 |
| 14 | 700 | 182 | 0.055 | 0.21 | 919 | 0.38 | 90.9 |
| 15 | 800 | 189 | 0.054 | 0.18 | 914 | 0.26 | 89.8 |
| 16 | 900 | 201 | 0.064 | 0.23 | 916 | 0.34 | 91.2 |
| 17 | 1000 | 188 | 0.068 | 0.20 | 925 | 0.52 | 89.6 |

Examples 18-19

The catalyst of Example 18 contained approximately 1% platinum, and was prepared in substantially the same manner as those of Examples 7-8. The barium exchanged support was calcined at a peak temperature of 900° F. for 1 hr, prior to impregnating with platinum. Example 19 used the catalyst of Examples 2 and 6.

The first step in evaluating the regenerability of a catalyst is to determine the activity of the fresh catalyst (cycle 1). Since this test is designed to measure the longer term activity performance and fouling rates, the catalysts were tested for catalytic performance under test conditions that were designed to be more severe than described in earlier Examples 1-17. In Examples 18-19, 10 cc of catalyst ground to 20×40 mesh size were loaded in a 17.5 in×½ in stainless steel reactor tube which was housed in a three-zone electrical furnace. The catalyst bed temperature was measured by a 5-tip thermocouple placed in an axial thermowell. Reactor operating conditions were 3 hr$^{-1}$ LHSV and 100 psig. The catalysts were exposed to a hydrocarbon feed (composition the same as in Examples 1-17) at a rate of 30 cc/hr, and at an initial temperature of about 800° F. Reactor temperatures were continually adjusted to maintain 76 wt. % aromatics in the liquid $C_5$+ product as determined by an on-line gas chromatograph with flame ionization detection.

For an initial line-out period (~100 hr), the reactor conditions used were 3 hr$^{-1}$ LHSV, a 3:1 $H_2$/hydrocarbon molar ratio, and 100 psig. In this line-out period, after the feed introduction, the temperature was raised until the catalyst was able to produce 60 wt. % aromatics in the $C_5$+ product as determined by GC analysis. For Example 18, after the initial line-out period of 143 hr, the $H_2$:hydrocarbon molar ratios were changed to 0.5:1 until 340 hr, then 2:1 until 1174 hr, and finally to 3:1 until the EOR at 2258 hr.

After the initial line-out period, the furnace temperature required to maintain 76 wt. % aromatics was plotted versus time to determine the fouling rate (see FIG. 1). A line was fit to the steady state data using a simple regression. The slope of the line gives the fouling rate and the start of run temperature is the y-intercept of the line. An approximate useful catalyst life was estimated as the time (in hours) before the reactor temperature reached (or would reach) 1000° F. (i.e., the yield adjusted temperature required to maintain 76 wt. % aromatics). The first cycle was conducted for about 2250 hr.

Following this first cycle, the catalyst was regenerated in-situ as follows. A hydrogen purge of the catalyst bed was performed for 4 hr at 800° F. at a $H_2$ flow rate of 300 cc/min, then the reactor was cooled to about 500° F. The flow was switched to a $N_2$ purge gas for 4 hr while the temperature decreased to about 400° F. Then, a 1 vol. % $O_2$ (balance $N_2$) gas mixture was introduced to the reactor at 300 cc/min. The temperature was increased at 100° F./hr to 425° F., and held at that temperature until the $CO_2$ in the effluent gas was 100 ppmw or less. Next, the temperature was increased at 50° F./hr to 600° F., and held at that temperature for 12 hr. The temperature was then increased at 25° F./hr to 700° F., and held at that temperature until the $CO_2$ in the effluent gas was less than 50 ppmw, then cooled to 400° F. The flow was switched to a $N_2$ purge gas at 300 cc/min for 1 hr. The catalyst was then reduced under flowing $H_2$ at 300 cc/min for 1 hr at 950° F.

Following regeneration, the catalyst was subjected to a second cycle of the aromatization reaction, at operating conditions of 3 hr-1 LHSV, a 3.5:1 $H_2$/hydrocarbon molar ratio, and 100 psig after the initial line-out period. FIG. 1 and Table V summarize the regenerability performance of the catalysts of Examples 18-19. As shown in FIG. 1 and Table V, the first cycle performance of the catalysts of Examples 18-19 was very similar. Unexpectedly, however, the performance in cycle 2, after regeneration, was significantly different. The catalyst of Example 19 was not regenerable, evidenced by virtually no useful life and a $\Delta T_{SOR}$ of over 60° F. In contrast, the $\Delta T_{SOR}$ was only 2° F. for the catalyst of Example 18, indicating a regenerable catalyst. More surprisingly, the useful life of the catalyst of Example 18 in cycle 2 far exceeded that of the catalyst of Example 18 in cycle 1.

TABLE V

Regeneration Experiments of Examples 18-19.

| | Example | | | |
|---|---|---|---|---|
| | 18 Cycle 1 | 18 Cycle 2 | 19 Cycle 1 | 19 Cycle 2 |
| $T_{SOR}$ (° F.) | 945 | 947 | 938 | 1001 |
| Regeneration $\Delta T_{SOR}$ (° F.) | $\Delta T_{SOR}$ = 2 | | $\Delta T_{SOR}$ = 63 | |
| Useful Life (hr) | 1400 | 4300 | 1400 | N/A |

The invention has been described above with reference to numerous embodiments and specific examples. Many variations will suggest themselves to those skilled in the art in light of the above detailed description. All such obvious variations are within the full intended scope of the appended claims. Other embodiments of the invention can include, but are not limited to, the following:

Embodiment 1

A method of producing a catalyst, the method comprising:
(a) contacting a zeolitic base with an alkaline earth metal-containing compound to form an alkaline earth metal exchanged zeolitic support;
(b) calcining the alkaline earth metal exchanged zeolitic support at a peak calcining temperature of less than about 550° C. (1022° F.);

(c) impregnating the calcined alkaline earth metal exchanged zeolitic support with a Group VIII transition metal-containing compound; and (d) calcining the impregnated alkaline earth metal exchanged zeolitic support to produce the catalyst having a surface area of at least about 165 m²/g.

Embodiment 2

The method defined in embodiment 1, wherein the contacting in step (a) comprises an ion exchange process.

Embodiment 3

The method defined in embodiments 1-2, wherein the alkaline earth metal-containing compound is in an aqueous solution.

Embodiment 4

The method defined in any of the preceding embodiments, wherein the alkaline earth metal-containing compound comprises barium, strontium, calcium, or a combination thereof.

Embodiment 5

The method defined in any of the preceding embodiments, wherein the alkaline earth metal-containing compound comprises barium.

Embodiment 6

The method defined in any of the preceding embodiments, wherein the alkaline earth metal-containing compound comprises a water soluble barium salt.

Embodiment 7

The method defined in any of the preceding embodiments, wherein the alkaline earth metal-containing compound comprises barium nitrate.

Embodiment 8

The method defined in any of the preceding embodiments, wherein the zeolitic base in step (a) is produced by a process comprising mixing a KL-zeolite with silica, extruding the mixture, drying, and calcining.

Embodiment 9

The method defined in embodiment 8, further comprising washing the calcined zeolitic base, drying, and calcining prior to performing step (a).

Embodiment 10

The method defined in any of the preceding embodiments, wherein the zeolitic base comprises a silica-bound KL-zeolite Embodiment 11

The method defined in any of the preceding embodiments, wherein the method further comprises an intermediate washing step prior to step (b), the intermediate washing step comprising contacting the alkaline earth metal exchanged zeolitic support with any washing composition disclosed herein, for example, comprising deionized water.

Embodiment 12

The method defined in embodiment 11, wherein the intermediate washing step is conducted at any washing temperature disclosed herein, for example, in a range from about 20° C. to about 95° C.

Embodiment 13

The method defined in embodiments 11-12, wherein the intermediate washing step includes any number of washing cycles (e.g., from 2 to 8) and any washing cycle time periods disclosed herein (e.g., in a range of from about 1 min to about 2 hr).

Embodiment 14

The method defined in any of the preceding embodiments, wherein the method further comprises an intermediate drying step prior to step (b), the intermediate drying step comprising contacting the alkaline earth metal exchanged zeolitic support with any intermediate drying gas stream disclosed herein, for example, comprising nitrogen, oxygen, air, or any combination thereof.

Embodiment 15

The method defined in embodiment 14, wherein the intermediate drying step is conducted at any intermediate drying temperature disclosed herein, for example, in a range from about 80° C. to about 200° C.

Embodiment 16

The method defined in embodiments 14-15, wherein the intermediate drying step is conducted for any intermediate drying step time period disclosed herein, for example, in a range of from about 1 to about 8 hr.

Embodiment 17

The method defined in any of the preceding embodiments, wherein the peak calcining temperature in step (b) is in any range of peak calcining temperatures disclosed herein, for example, from about 315° C. (600° F.) to about 538° C. (1000° F.), from about 371° C. (700° F.) to about 500° C. (932° F.), from about 399° C. (750° F.) to about 493° C. (920° F.), or from about 427° C. (800° F.) to about 482° C. (900° F.).

Embodiment 18

The method defined in any of the preceding embodiments, wherein the calcining in step (b) is conducted for any minimum calcining time or in any range of calcining time periods disclosed herein, for example, for at least about 1 hr, for a time period in a range of from about 1 to about 10 hr, or from about 1 to about 5 hr.

Embodiment 19

The method defined in any of the preceding embodiments, wherein the calcining in step (b) in conducted in any calcining gas stream disclosed herein, for example, comprising nitrogen, oxygen, air, or any combination thereof.

Embodiment 20

The method defined in any of the preceding embodiments, wherein the Group VIII transition metal-containing compound comprises platinum.

Embodiment 21

The method defined in any of the preceding embodiments, wherein the Group VIII transition metal-containing compound comprises tetraamineplatinum(II) chloride, tetraamineplatinum(II) nitrate, platinum(II) acetylacetonate, platinum(II) chloride, ammonium tetrachloroplatinate(II), chloroplatinic acid, or a combination thereof.

Embodiment 22

The method defined in any of the preceding embodiments, wherein the method further comprises a final drying step prior to step (d), the final drying step comprising contacting the impregnated zeolitic support with any final drying gas stream disclosed herein, for example, comprising nitrogen, oxygen, air, or any combination thereof.

Embodiment 23

The method defined in embodiment 22, wherein the final drying step is conducted at any final drying temperature disclosed herein, for example, in a range from about 80° C. to about 200° C.

Embodiment 24

The method defined in embodiments 22-23, wherein the final drying step is conducted for any final drying step time period disclosed herein, for example, in a range of from about 1 to about 8 hr.

Embodiment 25

The method defined in any of the preceding embodiments, wherein the calcining in step (d) is conducted at any final calcining temperature disclosed herein, for example, in a range from about 230° C. to about 500° C.

Embodiment 26

The method defined in any of the preceding embodiments, wherein the method further comprises a reducing step after step (d), the reducing step comprising contacting the catalyst with any reducing gas stream disclosed herein, for example, comprising hydrogen.

Embodiment 27

The method defined in embodiment 26, wherein the reducing step is conducted at any reducing temperature disclosed herein, for example, in a range from about 100° C. to about 550° C.

Embodiment 28

The method defined in any of the preceding embodiments, wherein the method does not include a contacting step between step (b) and step (c).

Embodiment 29

The method defined in any of the preceding embodiments, wherein step (a) is the only step in the method which utilizes an alkaline earth metal-containing compound, for example, a barium-containing compound.

Embodiment 30

The method defined in any of the preceding embodiments, wherein the method does not include a contacting step comprising a fluorine-containing compound.

Embodiment 31

The method defined in any of the preceding embodiments, wherein the method does not include a contacting step comprising a chlorine-containing compound other than the Group VIII transition metal-containing compound, for example, a platinum-containing compound.

Embodiment 32

The method defined in any of the preceding embodiments, wherein the method does not include a contacting step comprising a fluorine-containing compound or a chlorine-containing compound other than the Group VIII transition metal-containing compound, for example, a platinum-containing compound.

Embodiment 33

A catalyst obtained by the method defined in any of the preceding embodiments, for example, a supported aromatization catalyst.

Embodiment 34

A catalyst comprising:
(i) an alkaline earth metal exchanged zeolitic support; and
(ii) a Group VIII transition metal;
wherein the catalyst has a surface area of at least about 165 $m^2/g$.

Embodiment 35

The catalyst or method defined in any of the preceding embodiments, wherein the catalyst has a surface area greater than any minimum surface area or in any range of surface area disclosed herein, for example, at least about 180 $m^2/g$, from about 170 to about 210 $m^2/g$, or from about 180 to about 200 $m^2/g$.

Embodiment 36

The catalyst or method defined in any of the preceding embodiments, wherein the catalyst has a total pore volume greater than any minimum pore volume or in any range of pore volume disclosed herein, for example, at least about 0.17 cc/g, at least about 0.18 g/cc, or from about 0.17 to about 0.24 cc/g.

Embodiment 37

The catalyst or method defined in any of the preceding embodiments, wherein the catalyst has a micropore volume greater than any minimum micropore volume or in any range of micropore volume disclosed herein, for example, at least about 0.045 cc/g, at least about 0.055 g/cc, from about 0.05 to about 0.09 cc/g, or from about 0.055 to about 0.07 cc/g.

Embodiment 38

The catalyst or method defined in any of the preceding embodiments, wherein the catalyst is substantially free of fluorine, for example, less than 2500 ppmw.

Embodiment 39

The catalyst or method defined in any of the preceding embodiments, wherein the catalyst comprises less than any maximum amount of fluorine disclosed herein, for example, less than 2000 ppmw, less than 1000 ppmw, less than 500 ppmw, less than 100 ppmw, less than 50 ppmw, or less than 25 ppmw.

Embodiment 40

The catalyst or method defined in any of the preceding embodiments, wherein the Group VIII transition metal comprises platinum.

Embodiment 41

The catalyst or method defined in any of the preceding embodiments, wherein the Group VIII transition metal is platinum.

Embodiment 42

The catalyst or method defined in any of the preceding embodiments, wherein the catalyst comprises any weight percentage range of Group VIII transition metal disclosed herein, for example, from about 0.1 wt. % to about 10 wt. %, from about 0.2 wt. % to about 5 wt. %, or from about 0.3 wt. % to about 2 wt. % Group VIII transition metal, based on the total weight of the catalyst.

Embodiment 43

The catalyst or method defined in any of the preceding embodiments, wherein the catalyst comprises any weight percentage range of platinum disclosed herein, for example, from about 0.1 wt. % to about 10 wt. %, from about 0.2 wt. % to about 5 wt. %, or from about 0.3 wt. % to about 2 wt. % platinum, based on the total weight of the catalyst.

Embodiment 44

The catalyst or method defined in any of the preceding embodiments, wherein the zeolitic support comprises a medium pore zeolite, a large pore zeolite, or a combination thereof.

Embodiment 45

The catalyst or method defined in any of the preceding embodiments, wherein the zeolitic support comprises an L-zeolite, a Y-zeolite, a mordenite, an omega zeolite, and/or a beta zeolite.

Embodiment 46

The catalyst or method defined in any of the preceding embodiments, wherein the zeolitic support comprises a L-zeolite.

Embodiment 47

The catalyst or method defined in any of the preceding embodiments, wherein the catalyst comprises platinum and the zeolitic support comprises a L-zeolite.

Embodiment 48

The catalyst or method defined in any of the preceding embodiments, wherein the zeolitic support comprises a potassium L-zeolite Embodiment 49

The catalyst or method defined in any of the preceding embodiments, wherein the zeolitic support comprises an alkaline earth metal comprising barium, strontium, calcium, or a combination thereof.

Embodiment 50

The catalyst or method defined in any of the preceding embodiments, wherein the zeolitic support comprises barium.

Embodiment 51

The catalyst or method defined in any of the preceding embodiments, wherein the zeolitic support comprises a barium ion-exchanged L-zeolite.

Embodiment 52

The catalyst or method defined in any of the preceding embodiments, wherein the catalyst comprises any weight percentage range of alkaline earth metal disclosed herein, for example, from about 0.1 wt. % to about 50 wt. %, from about 1 wt. % to about 20 wt. %, or from about 2 wt. % to about 10 wt. % alkaline earth metal, based on the total weight of the catalyst.

Embodiment 53

The catalyst or method defined in any of the preceding embodiments, wherein the catalyst comprises any weight percentage range of barium disclosed herein, for example, from about 0.1 wt. % to about 50 wt. %, from about 1 wt. % to about 20 wt. %, or from about 2 wt. % to about 10 wt. % barium, based on the total weight of the catalyst.

Embodiment 54

The catalyst or method defined in any of the preceding embodiments, wherein the zeolitic support further comprises a binder.

Embodiment 55

The catalyst or method defined in embodiment 54, wherein the binder comprises an inorganic solid oxide, a clay, or a combination thereof.

Embodiment 56

The catalyst or method defined in embodiment 54, wherein the binder comprises alumina, silica, magnesia, boria, titania, zirconia, a mixed oxide thereof, or a mixture thereof.

Embodiment 57

The catalyst or method defined in embodiment 54, wherein the binder comprises silica.

Embodiment 58

The catalyst or method defined in embodiment 54, wherein the binder comprises montmorillonite, kaolin, cement, or a combination thereof.

Embodiment 59

The catalyst or method defined in embodiments 54-58, wherein the zeolitic support comprises any weight percentage range of binder disclosed herein, for example, from about 3 wt. % to about 35 wt. %, or from about 5 wt. % to about 30 wt. % binder, based on the total weight of the zeolitic support.

Embodiment 60

The catalyst or method defined in any of the preceding embodiments, wherein the catalyst further comprises chlorine.

Embodiment 61

The catalyst or method defined in embodiment 60, wherein the catalyst comprises any weight percentage range of chlorine disclosed herein, for example, from about 0.05 wt. % to about 5 wt. %, from about 0.1 wt. % to about 1 wt. %, or from about 0.1 wt. % to about 0.6 wt. % chlorine, based on the total weight of the catalyst.

Embodiment 62

The catalyst or method defined in any of the preceding embodiments, wherein the catalyst is characterized by any maximum $T_{SOR}$ or in any $T_{SOR}$ range disclosed herein, for example, less than about 499° C. (930° F.), or less than about 496° C. (925° F.).

Embodiment 63

The catalyst or method defined in any of the preceding embodiments, wherein the catalyst is characterized by any maximum Fouling Rate or in any Fouling Rate range disclosed herein, for example, less than about 0.28° C./hr (0.5° F./hr), or less than about 0.25° C./hr (0.45° F./hr).

Embodiment 64

The catalyst or method defined in any of the preceding embodiments, wherein the catalyst is characterized by any minimum $C_5+$ yield or in any range of $C_5+$ yield disclosed herein, for example, greater than about 90 wt. %, or greater than about 91 wt.

Embodiment 65

The catalyst or method defined in any of the preceding embodiments, wherein the catalyst is regenerable, for example, having a cycle length or useful life of the regenerated catalyst which is at least 0.5X (50% of X), wherein X is the cycle length or useful life (in hours) of the fresh catalyst.

Embodiment 66

The catalyst or method defined in embodiment 65, wherein the cycle length or useful life of the regenerated catalyst is at least 0.65X, for example, at least 0.75X, at least 0.8X, or at least X.

Embodiment 67

The catalyst or method defined in any of the preceding embodiments, wherein the catalyst is regenerable, for example, having a $\Delta T_{SOR}$ less than 30° F., wherein $\Delta T_{SOR}$ is the difference between the start of run temperature of the catalyst after regeneration and the start of run temperature of the fresh catalyst.

Embodiment 68

The catalyst or method defined in embodiment 67, wherein the $\Delta T_{SOR}$ is within 25° F., for example, less than 20° F., less than 15° F., or less than 10° F.

Embodiment 69

A reforming process comprising contacting a hydrocarbon feed with a supported aromatization catalyst under reforming conditions in a reactor system to produce an aromatic product, wherein the supported aromatization catalyst is the catalyst defined in any of the preceding embodiments.

Embodiment 70

The process defined in embodiment 69, wherein the hydrocarbon feed is any hydrocarbon feed disclosed herein, for example, comprising non-aromatic hydrocarbons, comprising $C_6$-$C_9$ alkanes and/or cycloalkanes, or comprising $C_6$-$C_8$ alkanes and/or cycloalkanes.

That which is claimed is:
1. A reforming process comprising:
  contacting a hydrocarbon feed with a supported aromatization catalyst under reforming conditions in a reactor system to produce an aromatic product; wherein the supported aromatization catalyst comprises:
  (i) a barium exchanged zeolitic support, wherein the zeolitic support comprises a large pore zeolite having an average pore diameter in a range of from about 7 Å to about 12 Å and from about 5 wt. % to about 30 wt. % binder, based on the total weight of the zeolitic support; and (ii) a Group VIII transition metal; wherein:

the supported aromatization catalyst has a surface area in a range from about 165 to about 225 m²/g, and the supported aromatization catalyst is substantially free of fluorine.

2. The process of claim 1, wherein the hydrocarbon feed comprises $C_6$-$C_8$ alkanes and/or cycloalkanes.

3. The process of claim 1, wherein the barium exchanged zeolitic support comprises a barium ion-exchanged L-zeolite.

4. The process of claim 1, wherein the barium exchanged zeolitic support comprises from about 10 wt. % to about 30 wt. % binder.

5. The process of claim 1, wherein the supported aromatization catalyst comprises:

from about 0.2 wt. % to about 5 wt. % platinum;
from about 1 wt. % to about 20 wt. % barium; and
less than 2000 ppmw fluorine.

6. The process of claim 1, wherein the supported aromatization catalyst has:

a surface area in a range from about 170 m²/g to about 210 m²/g;
a total pore volume in a range from about 0.17 cc/g to about 0.24 cc/g; and
a micropore volume in a range from about 0.05 cc/g to about 0.09 cc/g.

7. The process of claim 5, wherein:

the zeolitic support comprises a L-zeolite;
the binder comprises alumina, silica, magnesia, boria, titania, zirconia, a mixed oxide thereof, or a mixture thereof; and
the supported aromatization catalyst further comprises chlorine.

8. A reforming process comprising:

contacting a hydrocarbon feed with a supported aromatization catalyst under reforming conditions in a reactor system to produce an aromatic product; wherein the supported aromatization catalyst comprises:

(i) an alkaline earth metal exchanged zeolitic support, wherein the zeolitic support comprises a large pore zeolite having an average pore diameter in a range of from about 7 Å to about 12 Å and a binder; and (ii) a Group VIII transition metal; wherein:

the supported aromatization catalyst has a surface area of at least about 165 m²/g;
the supported aromatization catalyst has a total pore volume of at least about 0.17 cc/g; and
the supported aromatization catalyst is substantially free of fluorine.

9. The process of claim 8, wherein:

the zeolitic support comprises a L-zeolite; and
the zeolitic support further comprises from about 1 wt. % to about 20 wt. % barium, based on the total weight of the supported aromatization catalyst.

10. The process of claim 9, wherein the hydrocarbon feed comprises $C_6$-$C_8$ alkanes and/or cycloalkanes.

11. The process of claim 10, wherein:

the surface area is in a range from about 170 to about 210 m²/g; and the total pore volume is in a range from about 0.17 to about 0.24 cc/g.

12. The process of claim 8, wherein:

the Group VIII transition metal comprises platinum; and
the catalyst comprises from about 0.2 wt. % to about 5 wt. % platinum, based on the total weight of the supported aromatization catalyst.

13. The process of claim 8, wherein:

the supported aromatization catalyst comprises less than 500 ppmw fluorine; and
the supported aromatization catalyst further comprises chlorine.

14. The process of claim 8, wherein the zeolitic support comprises from about 5 wt. % to about 30 wt. % binder, based on the total weight of the zeolitic support.

15. The process of claim 8, wherein the supported aromatization catalyst has:

a surface area in a range from about 170 to about 210 m²/g;
a total pore volume in a range from about 0.17 to about 0.24 cc/g; and
a micropore volume in a range from about 0.05 to about 0.09 cc/g.

16. A reforming process comprising:

contacting a hydrocarbon feed with a supported aromatization catalyst under reforming conditions in a reactor system to produce an aromatic product; wherein the supported aromatization catalyst comprises:

(i) an alkaline earth metal exchanged zeolitic support, wherein the zeolitic support comprises a large pore zeolite having an average pore diameter in a range of from about 7 Å to about 12 Å and a binder;

(ii) from about 0.2 wt. % to about 5 wt. % platinum, based on the total weight of the supported aromatization catalyst; and (iii) from about 1 wt. % to about 20 wt. % barium, based on the total weight of the supported aromatization catalyst; wherein:

the supported aromatization catalyst has a surface area of at least about 165 m²/g;
the supported aromatization catalyst is substantially free of fluorine; and
a cycle length or useful life of a regenerated supported aromatization catalyst is at least 50% of the cycle length or useful life of the fresh supported aromatization catalyst.

17. The process of claim 16, wherein the hydrocarbon feed comprises $C_6$-$C_8$ alkanes and/or cycloalkanes.

18. The process of claim 17, wherein the zeolitic support comprises a L-zeolite.

19. The process of claim 18, wherein the supported aromatization catalyst comprises from about 2 wt. % to about 10 wt. % barium.

20. The process of claim 19, wherein the supported aromatization catalyst comprises less than 500 ppmw fluorine.

21. The process of claim 20, wherein the surface area is in a range from about 170 to about 210 m²/g.

22. The process of claim 19, wherein the supported aromatization catalyst has a total pore volume in a range from about 0.17 to about 0.24 cc/g.

* * * * *